(12) United States Patent
Finette et al.

(10) Patent No.: US 10,005,862 B2
(45) Date of Patent: *Jun. 26, 2018

(54) PROCESS FOR COPOLYMERIZING ETHYLENE AND ESTERS OF VINYL ALCOHOL

(71) Applicant: Basell Polyolefine GmbH, Wesseling (DE)

(72) Inventors: Andre-Armand Finette, Köln (DE); Christoph Wolf, Pulheim-Dansweiler (DE); Danir Khayrullin, Bruehl (DE); Giulia Mei, Ferrara (IT); Juergen Mohrbutter, Alfter (DE); Dieter Littmann, Mücke (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/654,252

(22) PCT Filed: Dec. 16, 2013

(86) PCT No.: PCT/EP2013/076683
§ 371 (c)(1),
(2) Date: Jun. 19, 2015

(87) PCT Pub. No.: WO2014/095708
PCT Pub. Date: Jun. 26, 2014

(65) Prior Publication Data
US 2016/0289356 A1    Oct. 6, 2016

(30) Foreign Application Priority Data

Dec. 20, 2012   (EP) .................................. 12198350

(51) Int. Cl.
*C08F 210/02* (2006.01)
*C08F 210/04* (2006.01)
(Continued)

(52) U.S. Cl.
CPC .................................. *C08F 210/02* (2013.01)

(58) Field of Classification Search
CPC ..... C08F 210/02; C08F 218/04; C08F 218/08
(Continued)

(56) References Cited

U.S. PATENT DOCUMENTS 3,404,177 A * 10/1968 Baba ........................ B01J 12/00
203/14
4,091,200 A    5/1978 Vandegaer
(Continued)

FOREIGN PATENT DOCUMENTS

CN    102731298 A    10/2012
SU    1113384 A1    9/1984
(Continued)

OTHER PUBLICATIONS

Desiccant Performance Data Sheet (2 pages), Sud-Chemie, Inc. (Copyright 2011).*
(Continued)

*Primary Examiner* — Fred M Teskin

(57) ABSTRACT

Process for copolymerizing ethylene and esters of vinyl alcohol in the presence of free-radical polymerization initiators at pressures in the range of from 110 MPa to 500 MPa and temperatures in the range of from 100° C. to 350° C. in a continuously operated polymerization apparatus comprising a polymerization reactor and one or more compressors, which compress the monomer mixture fed to the polymerization reactor to the polymerization pressure, wherein the monomer mixture is compressed by a sequence of compression stages in which the compressed gas
(Continued)

mixture is cooled after each compression stage and the fraction of the monomer mixture, which is liquid after this cooling, is separated off and returned to the polymerization apparatus in liquid form, and wherein at least a part of the liquid fractions obtained after compressing the monomer mixture in the respective compression stage to a pressure of from 0.2 MPa to 10 MPa is purified before being returned to the polymerization process.

10 Claims, 2 Drawing Sheets

(51) Int. Cl.
    *C08F 210/08*     (2006.01)
    *C08F 2/00*     (2006.01)
    *C07C 67/54*     (2006.01)

(58) Field of Classification Search
    USPC .................................................. 526/77, 331
    See application file for complete search history.

(56) References Cited

U.S. PATENT DOCUMENTS

| | | | |
|---|---|---|---|
| 4,260,722 A | 4/1981 | Pfleger et al. | |
| 4,379,940 A * | 4/1983 | Dickerson | C07C 67/56 560/248 |
| 6,300,430 B1 | 10/2001 | Deckers et al. | |
| 7,582,724 B2 * | 9/2009 | Guenaltay | C08F 6/003 526/331 |
| 9,272,979 B2 * | 3/2016 | Neumann | C07C 67/52 |

| | | | |
|---|---|---|---|
| 2005/0037219 A1 | 2/2005 | Ohlsson et al. | |
| 2013/0085241 A1 | 4/2013 | Solis et al. | |
| 2013/0274424 A1 | 10/2013 | Weiand et al. | |

FOREIGN PATENT DOCUMENTS

| | | |
|---|---|---|
| WO | WO 99/14251 A1 | 3/1999 |
| WO | WO 2008/019873 A1 | 2/2008 |
| WO | WO 2012/084772 A1 | 6/2012 |
| WO | WO 2013/052264 A1 | 4/2013 |

OTHER PUBLICATIONS

Wiley-VCH, Ullmann's Encyclopedia of Industrial Chemistry, 7th Edition, Dec. 31, 2011, pp. 7-8.

Jinli Zhang, Study of Molecular Design, Syntheis and Application of EVA-Based Polymers, Ph. D. Dissertation, Tianjin University, May 31, 2003.

PCT International Search Report & Written Opinion mailed Feb. 4, 2014, for PCT/EP2013/076683.

Third Party Observations for PCT/EP2013/076683 on Nov. 6, 2014, 9 pages.

Nareshkumar Ramanbhai Vaghela et al, "Heavy Oil Removal Process from Vinyl Acetate", International Journal of ChemTech Research, Jul.-Sep. 2011, vol. 3, No. 3, pp. 1259-1261, XP055184864.

Ullmann's Encyclopedia of Industrial Chemistry, 6$^{th}$ Edition, 1998 Electronic Release, pp. 1-33, 120, XP003034193.

Al-Malaika S, Reactive Modifiers for Polymers, 1997, Springer, p. 1, XP003034194.

Dalian Institute of Technology et al, Oxidation Dehydrogenation of Butene to Prepare Butadiene, Apr. 1979, Chemistry Industry Publisher, Beijing, China.

* cited by examiner

PROCESS FOR COPOLYMERIZING ETHYLENE AND ESTERS OF VINYL ALCOHOL

This application is the U.S. National Phase of PCT International Application PCT/EP2013/076683, filed Dec. 16, 2013, claiming benefit of priority to European Patent Application No. 12198350.6, filed Dec. 20, 2012, the contents of which are incorporated herein by reference in its entirety.

FIELD OF THE INVENTION

The present invention relates to a process for copolymerizing ethylene and esters of vinyl alcohol in the presence of free-radical polymerization initiators at pressures in the range of from 110 MPa to 500 MPa and temperatures in the range of from 100° C. to 350° C. in a continuously operated polymerization apparatus.

BACKGROUND OF THE INVENTION

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE).

A normal set-up of a plant for polymerizing or copolymerizing ethylenically unsaturated monomers such as ethylene and esters of vinyl alcohol in the presence of free-radical polymerization initiators consists essentially of a set of two compressors, a low-pressure and a high-pressure compressor, a polymerization reactor, which can be an autoclave or a tubular reactor or a combination of such reactors, and two separators for separating the monomer-polymer mixture leaving the reactor, wherein in the first separator, the high-pressure separator, the ethylene and comonomers separated from the monomer-polymer mixture are recycled to the reaction mixture between the low-pressure compressor and the high-pressure compressor, and the ethylene and comonomers separated from the mixture in the second separator, the low-pressure separator, are fed to the low-pressure compressor where it is compressed to the pressure of the fresh ethylene feed, combined with the fresh ethylene feed and the combined streams are further pressurized to the pressure of the high-pressure gas recycle stream. Such a high-pressure polymerization unit normally further includes apparatuses like extruders and granulators for pelletizing the obtained polymer. In case of tubular reactors, monomer supply to the reactor can either be carried out solely in the beginning of the reactor or only partly in the beginning with the other part fed via one or more side feed entries. Moreover, it is also common to introduce initiator in more than one place down the tube, thus creating more than one reaction zone.

The properties and the structure of the obtained ethylene polymers or copolymers, such as molecular weight, molecular weight distribution and the amount of short- and long-chain branching, depend strongly on the reaction parameters pressure and temperature. That means control of the reaction conditions is essential. There are of course additional possibilities to influence the nature of the produced polymers, for example the addition of chain-transfer agents, which reduce the molecular weight, however in general the possibilities to vary the reaction conditions while obtaining a specific target product are quite limited. A further limiting factor for the production of ethylene polymers or copolymers is heat removal from the reactor, because the heat of polymerization of ethylene is relatively high. That means, for obtaining different grades of polymers, i.e., polymers which differ in melt flow rate (MFR) and density, it is in general necessary to adjust the operating parameters, which might result in different output rates.

Radically initiated high-pressure polymerization is an appropriated method for producing copolymers of ethylene and esters of vinyl alcohol, especially for preparing copolymers of ethylene and esters of vinyl alcohol having a vinyl ester content in the range of from 1% of weight to 45% of weight. Suitable reactors can be stirred autoclave reactors or tubular reactors. Such high-pressure polymerizations are for example described in U.S. Pat. No. 4,091,200, EP 012 368 A1 and WO 99/014251 A1. An obstacle for producing copolymers of ethylene and vinyl esters in high-pressure polymerization is however that the comonomers and the produced ethylene-vinyl ester copolymers can degrade to acetic acid or other hydrocarbon acids which are highly corrosive for the polymerization apparatuses.

Moreover, as in nearly all commercial processes, there is a permanent demand for improving the efficiency of the production process. Accordingly, there is a continuous desire to increase the capacity of existing polymerization plants by increasing the production rate of the polymerization reactors without adversely affecting the properties of the produced ethylene copolymers.

Thus, it was the object of the present invention to overcome the disadvantages of prior art processes for the preparation of copolymers of ethylene and esters of vinyl alcohol in the presence of free-radical polymerization initiators and to reduce of the corrosion caused by degradation products of the comonomers and the obtained ethylene-vinyl ester copolymers and to provide a possibility for increasing the production rate in high-pressure copolymerization of ethylene and vinyl esters.

SUMMARY OF THE INVENTION

We found that this object is achieved by a process for copolymerizing ethylene and esters of vinyl alcohol in the presence of free-radical polymerization initiators at pressures in the range of from 110 MPa to 500 MPa and temperatures in the range of from 100° C. to 350° C. in a continuously operated polymerization apparatus comprising a polymerization reactor and one or more compressors, which compress the monomer mixture fed to the polymerization reactor to the polymerization pressure, wherein the monomer mixture is compressed by a sequence of compression stages in which the compressed gas mixture is cooled after each compression stage and the fraction of the monomer mixture, which is liquid after this cooling, is separated off and returned to the polymerization apparatus in liquid form, and wherein at least a part of the liquid fractions obtained after compressing the monomer mixture in the respective compression stage to a pressure of from 0.2 MPa to 10 MPa is purified before being returned to the polymerization process.

By purifying at least a part of the liquid fractions obtained after compressing the monomer mixture, it is possible in the production of copolymers of ethylene and vinyl esters having a relatively high molecular weight to increase the maximum polymerization temperature in the individual polymerization zones without inducing a drop in the average molecular weight. For polymerization in tubular reactors however, increasing the maximum polymerization temperature enables a higher heat removal from the reactor and accordingly a higher turnover in the reaction mixture after having passed the polymerization reactor. Since the throughput of the compressors of a specific polymerization apparatus is more or less fixed, this also means that the capacity of the tubular reactor is increased. Moreover, also for polymerization in autoclave reactors a higher maximum polymerization temperature means a higher turnover and a higher capacity, since turnover and maximum polymerization temperature are directly proportional in these adiabatic reactors. However, in polymerization processes for preparing copolymers of ethylene and vinyl esters according to the prior art, the limiting factor for the maximum polymerization temperature is, at a given vinyl ester content, the average molecular weight of the produced ethylene copolymers.

BRIEF DESCRIPTION OF THE DRAWINGS

The features and advantages of the present invention can be better understood via the following description and the accompanying drawings where.

DETAILED DESCRIPTION OF THE INVENTION

Figure 1:
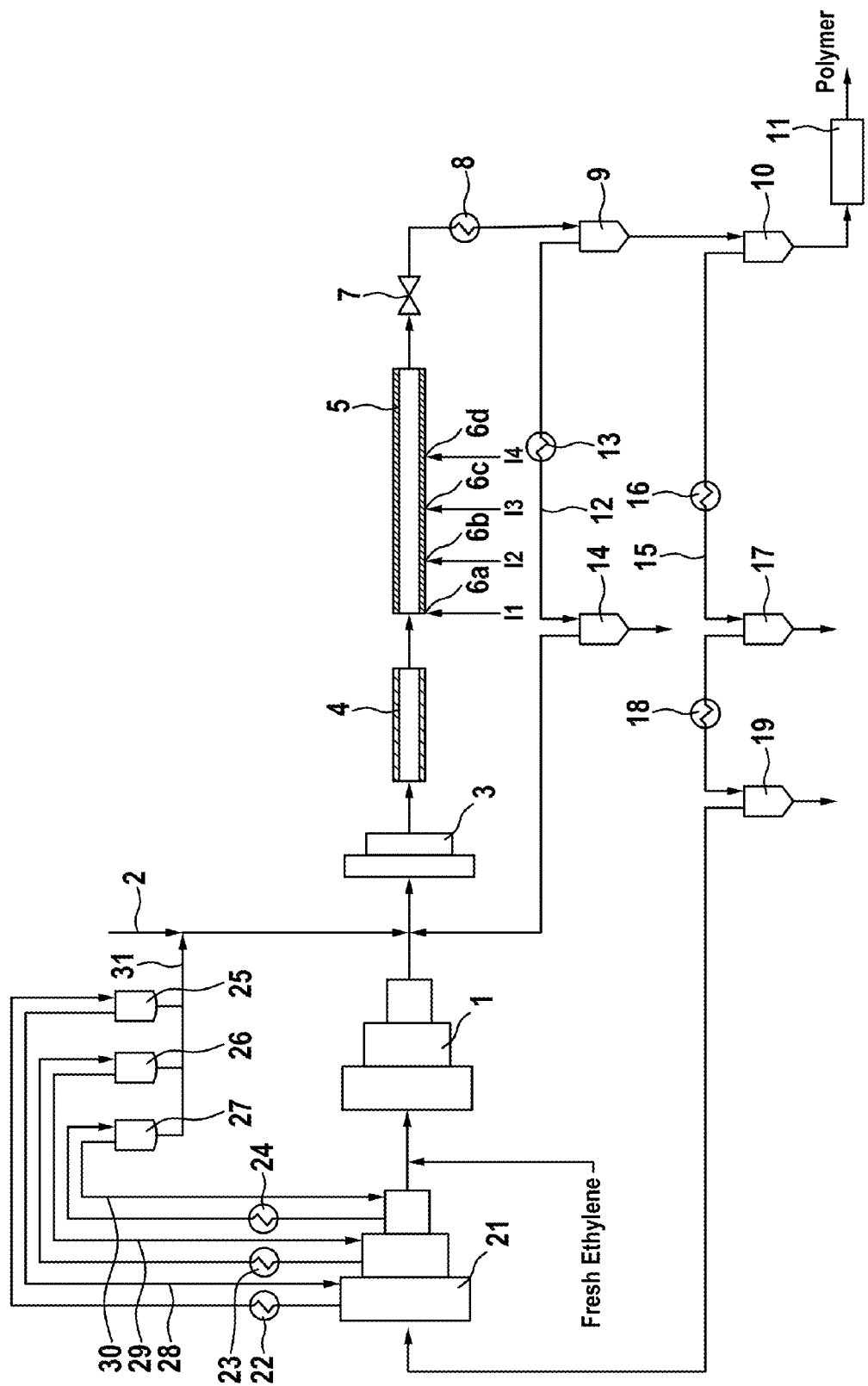
FIG. 1 shows schematically a typical set-up for a polymerization apparatus for copolymerizing ethylene and esters of vinyl alcohol such as vinyl acetate according to the prior art and FIG. 2 shows schematically such a set-up according to the present invention.

The process of the invention refers to copolymerizing ethylene and esters of vinyl alcohol. Preferred comonomers are esters of vinyl alcohol which have a total of from 4 to 15 carbon atoms, such as vinyl acetate, vinyl propionate and vinyl butyrate. An especially preferred comonomer is vinyl acetate. The copolymerization can also be carried out in the presence of more than one of these comonomers.

It is also possible to use additional comonomers beside ethylene and vinyl esters in the copolymerization. Examples of suitable additional comonomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. Propene, 1-butene, 1-hexene, acrylic acid, n-butyl acrylate, tert-butyl acrylate, or 2-ethylhexyl acrylate are particularly suitable as additional comonomer. However, most preferably the copolymerization of the present invention is only a copolymerization of ethylene and esters of vinyl alcohol.

The ethylene copolymers obtained by the process of the present invention have preferably a comonomer content of from 3 to 50% by weight, more preferably from 5 to 45% by weight and especially of from 10 to 40% by weight. In an especially preferred embodiment, ethylene-vinyl acetate copolymers are obtained which having a vinyl acetate content of from 10 to 40% by weight.

The proportion of comonomer or comonomers in the reaction mixture is accordingly preferably from 3 to 50% by weight and more preferably from 5 to 45% by weight and especially of from 10 to 40% by weight, based on the amount of monomers, i.e. the sum of ethylene and all comonomers. Depending on the type of comonomer, it can be preferred to feed the comonomers at a plurality of different points to the reactor.

For the purposes of the present invention, polymers are all substances which are made up of at least two monomer units. They are preferably copolymers having an average molecular weight $M_n$ of more than 20 000 g/mole. However, the method of the invention can also be advantageously employed in the preparation of oligomers, waxes and polymers having a molecular weight $M_n$ of less than 20 000 g/mole.

Possible initiators for starting the free-radical polymerization in the respective reaction zones are in general all substances that can produce radical species under the conditions in the polymerization reactor. Examples for such free-radical polymerization initiators are organic peroxides or azo compounds which both represent a preferred embodiment of the process of the present invention. Examples of suitable organic peroxides are peroxy esters, peroxy ketals, peroxy ketones and peroxycarbonates, e.g. di(2-ethyl hexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoylperoxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)cyclohexane, tert-butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, di-(2-ethylhexyl)peroxydicarbonate, tert-butyl peroxy-2-ethylhexanoate, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using tert-butyl peroxy-3,5,5-trimethylhexanoate, di-(2-ethylhexyl)peroxydicarbonate or tert-butyl peroxy-2-ethyl hexanoate.

The initiators can be employed individually or as a mixture in concentrations of from 0.1 mol/t to 50 mol/t of polyethylene produced, in particular from 0.2 mol/t to 20 mol/t, in each reaction zone. In a preferred embodiment of the present invention the free-radical polymerization initiator, which is fed to a reaction zone, is a mixture of at least two different azo compounds or organic peroxides. If such initiator mixtures are used it is preferred that these are fed to all reaction zones. There is no limit for the number of different initiators in such a mixture, however preferably the mixtures are composed of from two to six and in particular of two, three or four different initiators. Particular preference is given to using mixtures of initiators which have different decomposition temperatures.

It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight.

In the process of the invention, the molecular weight of the polymers to be prepared can as usual be altered by addition of modifiers which act as chain-transfers agents. Examples of suitable modifiers are hydrogen, aliphatic and olefinic hydrocarbons, e.g. propane, butane, pentane, hexane, cyclohexane, propene, 1-butene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or 1-olefins such as propene, 1-butene or 1-hexene, or aliphatic hydrocarbons such as propane.

The process of the invention is carried out at pressures of from 110 MPa to 500 MPa, with pressures of from 160 MPa to 350 MPa being preferred and pressures of from 200 MPa to 330 MPa being particularly preferred. The temperatures are in the range from 100° C. to 350° C., preferably from 120° C. to 300° C. and very particularly preferably from 130° C. to 290° C.

The process of the present invention can be carried out with all types of high-pressure reactors appropriate for high-pressure polymerization. Suitable high-pressure reactors are, for example, tubular reactors or autoclave reactors or combinations of such reactors. Preferably the high-pressure reactors are tubular reactors or autoclave reactors and in particular tubular reactors. Common high-pressure autoclave reactors are stirred reactors and have a length-to-diameter ratio of in the range from 2 to 30, preferably from 10 to 20. Appropriate tubular reactors are basically long, thick-walled pipes, which are usually from about 0.5 km to 4 km, preferably from 1 km to 3 km and especially from 1.5 km to 2.5 km long. The inner diameter of the pipes is usually in the range of from about 30 mm to 120 mm and preferably from 40 mm to 90 mm. Such tubular reactors have preferably a length-to-diameter ratio of greater than 1000, preferably from 10000 to 40000 and especially from 25000 to 35000.

Preferred tubular reactors have at least two reaction zones, preferably from 2 to 6 reaction zones and more preferably from 2 to 5 reaction zones. The number of reaction zones is given by the number of feeding points for the initiator. Such a feeding point can, for example, be an injection point for a solution of azo compounds or organic peroxides. Fresh initiator is added to the reactor, where it decomposes into free radicals and initiates further polymerization. The generated heat of the reaction rises the temperature of the reaction mixture, since more heat is generated than can be removed through the walls of the tubular reactor. The rising temperature increases the rate of decomposition of the free-radical initiators and accelerates polymerization until essentially all free-radical initiator is consumed. Thereafter no further heat is generated and the temperature decreases again since the temperature of the reactor walls is lower than that of the reaction mixture. Accordingly, the part of the tubular reactor downstream of an initiator feeding point in which the temperature rises is the reaction zone, while the part thereafter, in which the temperature decreases again, is predominantly a cooling zone. The amount and nature of added free-radical initiators determines how much the temperature rises and accordingly allows adjusting that value. Normally, the temperature rise is set to be in the range of from 70° C. to 150° C. in the first reaction zone and 50° C. to 110° C. for the subsequent reaction zones depending on the product specifications and the reactor configuration.

The compression of the monomer mixture to the polymerization pressure according to the present invention is carried out by at least two sequentially operating compressors in which a low-pressure compressor first compresses the monomer mixture to a pressure of from 10 MPa to 50 MPa and a high-pressure compressor then further compresses the monomer mixture to the polymerization pressure of from 110 MPa to 500 MPa. Preferably the low-pressure compressor and the high-pressure compressor are multistage compressors. It is further possible to separate one or more stages of one or both of these compressors and divide them into separated compressors. However, usually a series of one low-pressure compressor and one high-pressure compressor is used for compressing the monomer mixture to the polymerization pressure. In such cases, sometimes the whole low-pressure compressor is designated as primary compressor. However, it is also common to designate the one or more first stages of the low-pressure compressor, which compress the recycle gas from the low-pressure separator to the pressure of the fresh ethylene feed, as booster compressor and the one or more further stages as primary compressor although they are all part of one apparatus.

Commonly the polymerization apparatus comprises, beside the polymerization reactor, a high-pressure gas recycle line for recycling gas separated in a high-pressure separator from the reaction mixture and a low-pressure gas recycle line for recycling gas separated in a low-pressure separator from the reaction mixture. The gas recycled in the high-pressure gas recycle line is then fed to the high-pressure compressor and the gas recycled in the low-pressure gas recycle line is fed to the low-pressure compressor, preferably to the foremost of the stages. Preferably, the recycled gas coming from the low-pressure gas recycle line is compressed by the booster compressor to the pressure of the fresh feed of ethylenically unsaturated monomers, preferably ethylene, thereafter combined with the fresh gas feed and the combined gases are further compressed in the primary compressor, to the pressure of from 10 MPa to 50 MPa. Preferably, the low-pressure compressor, i.e. the combination of booster compressor and primary compressor, comprises five or six compression stages, two or three in the booster compressor before adding the fresh gas and two or three in the primary compressor after adding the fresh gas.

As common for compressors utilized in the high-pressure polymerization of ethylene, according to the present invention the compressed monomer mixture is cooled after each compression stage of the low-pressure compressor and the fraction of the gas mixture, which is liquid after this cooling, is separated off and returned to the polymerization apparatus in liquid form. Preferably the liquid fractions obtained after the individuals compression stages are first combined before being returned to the polymerization apparatus. Preferably these liquids are recycled to a position between the low-pressure compressor and the high-pressure compressor.

According to the process of the present invention at least a part of the liquid fractions obtained after compressing the monomer mixture in the pressure range of from 0.1 MPa to 10 MPa is purified before being returned to the polymerization process. That means, at least a part of the liquid obtained after compressing in stages of the booster compressor are purified. Preferably the whole amount of the liquids is purified.

Preferably the purification of the separated liquid fraction comprises a distillation step, more preferably a two-step distillation. In a preferred embodiment of the present invention the liquid fraction is fed to a first distillation column, preferably at a position in the center of the column. A relatively high boiling fraction, which usually contains as main components hydrocarbons having eight or more carbon atoms, for example isodocecane which is commonly used as solvent for initiators, acetic acid and tert-butanol, is then withdrawn at the bottom of the column and preferably discarded. A relatively low boiling fraction is withdrawn from the top of the column and transferred to a second distillation column, preferably at a position in the center of the column. A relatively low boiling fraction, which usually contains as main components acetaldehyde, acetone, methanol and traces of water, is withdrawn at the top of the second distillation column and preferably discarded. Purified vinyl esters such as vinyl acetate are then withdrawn from the bottom of second distillation column.

It is also preferred that the purification of the separated liquid fraction comprises a step of water removal by means of a molecular sieve.

In a preferred embodiment of the present invention the liquid fractions are both purified by distillation and by removing water by means of a molecular sieve. Then preferably the liquid fractions are first purified by distillation, preferably a two-step distillation, and thereafter treated by a molecular sieve. In such a set-up, the fresh comonomer feed is then preferably also first send to the water removal unit and thereafter fed to the polymerization apparatus together with the purified liquid coming from the distillation step. In such a case the water content of the fresh comonomer is usually reduced from about 200 to 400 ppm (mass/mass) to less than 30 ppm (mass/mass).

Preferably the content of esters of vinyl alcohol in the purified liquid fractions, that means before being returned to the polymerization apparatus, is more than 99.5% of weight, more preferably more than 99.7% of weight and especially more than 99.9% of weight. The water content of the purified liquid fractions is preferably less than 30 ppm.

FIG. 1 shows schematically a typical set-up for a polymerization apparatus with a tubular reactor for copolymerizing ethylene and esters of vinyl alcohol such as vinyl acetate according to the prior art. The polymerization process is described on the basis of vinyl acetate as vinyl ester comonomer.

The fresh ethylene, which has a pressure of 4.0 MPa, is added to the polymerization system upstream of a primary compressor (1), by which it is compressed together with recycle gas to a pressure of about 28 MPa. The fresh vinyl acetate is added via line (2). Thereafter the gas mixture is compressed to the polymerization pressure of about 300 MPa using a high-pressure compressor (3). The monomer mixture leaving the high-pressure compressor (3) is fed to pre-heater (4), where the reaction mixture is preheated to the reaction start temperature of from about 120° C. to 180° C., and then conveyed to the tubular reactor (5).

The tubular reactor (5) is basically a long, thick-walled pipe with cooling jackets to remove the liberated heat of reaction from the reaction mixture by means of a coolant circuit (not shown). It is usually from about 0.5 km to 4 km, preferably from 1 km to 3 km and especially from 1.5 km to 2.5 km long. The inner diameter of the pipe is usually in the range of from about 30 mm to 120 mm and preferably from 60 mm to 90 mm.

The tubular reactor (5) shown in FIG. 1 has four spatially separated initiator injection points (6a) to (6d) for feeding initiators or initiator mixtures I1 to I4 to the reactor and accordingly also four reaction zones. By feeding suitable free-radical initiators, which decompose at the temperature of the reaction mixture, to the tubular reactor the polymerization reaction starts. The generated heat of the reaction rises the temperature of the reaction mixture, since more heat is generated than can be removed through the walls of the tubular reactor.

The amount and nature of added free-radical initiators determines how much the temperature rises and accordingly allows adjusting that value. Normally, the temperature rise in the first reaction zone is set to be in the range of from 70° C. to 150° C. and 50° C. to 110° C. for the subsequent reaction zones depending on the product specifications and reactor configuration. The reaction mixture leaves the tubular reactor (5) through a high-pressure let-down valve (7) and passes a post reactor cooler (8). Thereafter, the resulting polymer is separated off from unreacted ethylene and vinyl acetate and from other low molecular weight compounds (oligomers, polymers, additives, solvent, etc.) by means of a high-pressure separator (9) and a low-pressure separator (10), discharged and pelletized via an extruder and granulator (11).

The part of ethylene and vinyl acetate which has been separated off in the high-pressure separator (9) is fed back to the inlet end of the tube reactor (5) in the high-pressure circuit (12) at 28 MPa. It is first freed from other constituents in at least one purification stage and then added to the monomer stream between primary compressor (1) and high-pressure compressor (3). FIG. 1 shows one purification stage consisting of a heat exchanger (13) and a separator (14). It is however also possible to use a plurality of purification stages. The high-pressure circuit (12) usually separates waxes.

The ethylene and the non-reacted vinyl acetate which have been separated off in the low-pressure separator (10) and which further comprise, inter alia, the major part of the low molecular weight products of the polymerization (oligomers), is worked up in the low-pressure circuit (15) at a pressure of from about 0.1 to 0.4 MPa in a plurality of separators with a heat exchanger being located between each of the separators and then fed to a booster compressor (21), in which it is compressed to a pressure of about 4 MPa and then conveyed to primary compressor (1). Booster compressor (21) and primary compressor (1) are preferably part of one low-pressure compressor, i.e. of one apparatus powered by one motor. FIG. 1 shows two purification stages consisting of heat exchangers (16) and (18) and separators (17) and (19). It is however also possible to use only one purification stage or preferably more than two purification stages. The low-pressure circuit (15) usually separates oil and waxes.

The gas mixtures compressed in the individual stages of the booster compressor (21) are cooled after every stage by heat exchanges (22), (23) and (24). Caused by the limited solubility of vinyl acetate in ethylene in the respective pressure range, a part of the vinyl acetate condenses by cooling the gas mixture and is separated off in separators (25), (26) and (27). The gaseous phases are returned to the corresponding next compression stages via lines (28), (29) and (30). The liquid phases, mainly consisting of vinyl acetate, are combined and returned to the polymerization process via line (31).

Figure 2:
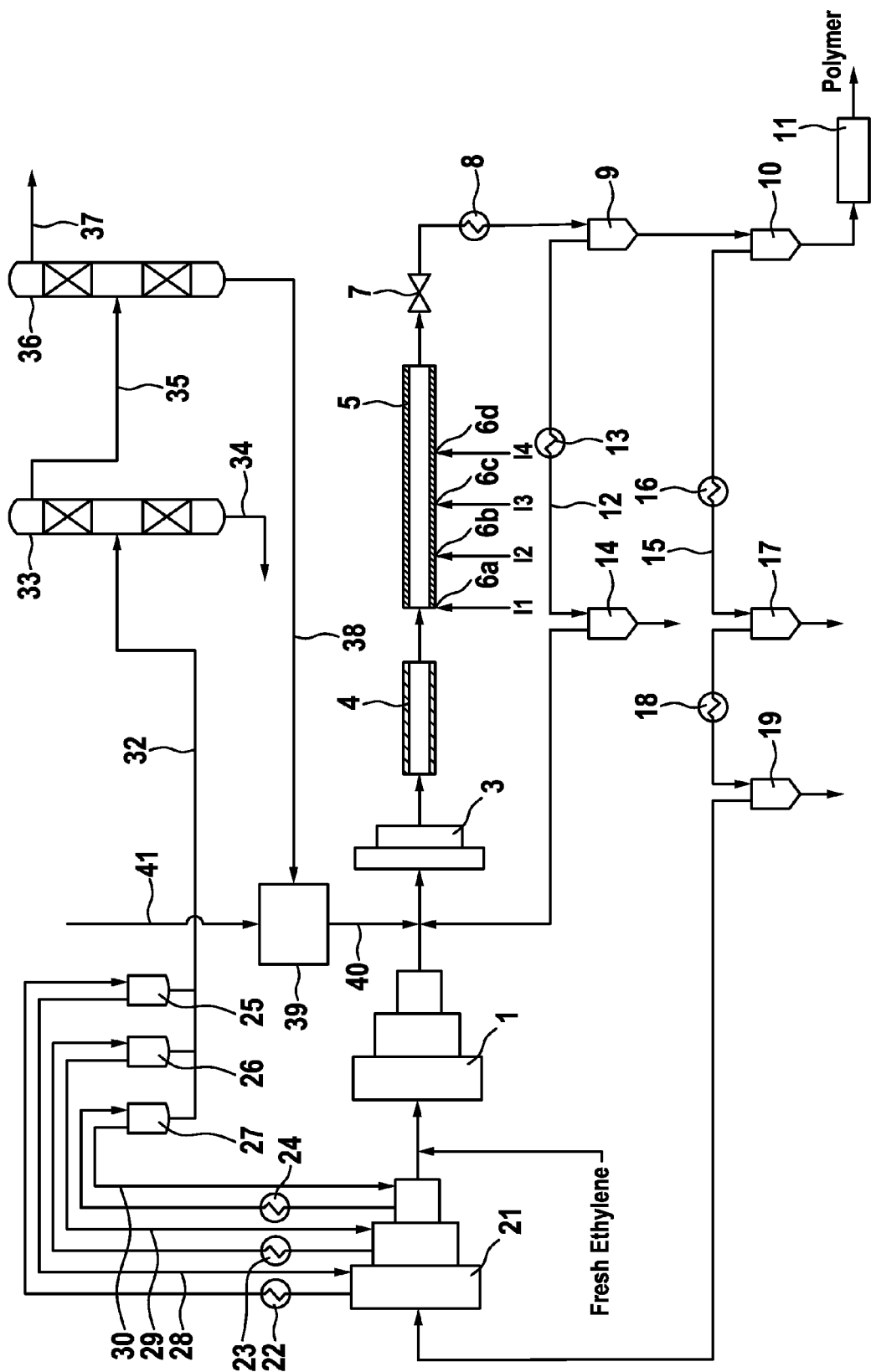

FIG. 2 shows schematically a set-up for a polymerization apparatus with a tubular reactor for copolymerizing ethylene and esters of vinyl alcohol such as vinyl acetate according to the present invention. The polymerization process is described on the basis of vinyl acetate as vinyl ester comonomer, however this non-limiting the scope of the invention.

Polymerization as well as separating off and recycling non-reacted ethylene and vinyl acetate are carried out as in the scheme shown in FIG. 1. Furthermore, also the gas mixtures compressed in the individual stages of the booster compressor (21) are cooled after every stage by heat exchanges (22), (23) and (24), separated from condensed components in separators (25), (26) and (27) and returned to the corresponding next compression stages via lines (28), (29) and (30).

The liquid phases obtained in separators (25), (26) and (27), which consist mainly of vinyl acetate, are combined and transferred via line (32) to a distillation column (33). At the bottom of column (33), a relatively high boiling fraction consisting mainly of hydrocarbons having eight or more carbon atoms, acetic acid and tert-butanol is withdrawn via line (34) and discarded. The relatively low boiling fraction containing most of the vinyl acetate is withdrawn from the top of columns (33) and transferred via line (35) to a second distillation column (36). At the top of column (36), a relatively low boiling fraction consisting mainly of acetaldehyde, acetone and methanol is withdrawn via line (37) and discarded. Purified vinyl acetate is withdrawn from the bottom of column (36) and transferred via line (38) to water removal unit (39) and then recycled via line (40) to the polymerization process. The water removal unit (39) usually comprises a molecular sieve. The fresh vinyl acetate is added via line (41) and then also passed through water removal unit (39) before being fed to the polymerization process via line (40).

An advantage of the process of the present invention is that it allows copolymerizing ethylene and esters of vinyl alcohol at higher maximum polymerization temperatures without impacting the polymer properties such as a loss in molecular weight. Caused by the accordingly possible higher heat removal from tubular reactors, a higher turnover in the reaction mixture after having passed the polymerization reactor can be achieved and the capacity of the tubular reactor is increased. Furthermore, a higher turnover is also achievable in autoclave reactors since the turnover is directly proportional to the maximum polymerization temperatures in these adiabatic reactors without heat removal and the average molecular weight of the produced ethylene copolymers is, at a given vinyl ester content, also for copolymerizing ethylene and vinyl esters in autoclave reactors the limiting factor for the maximum polymerization temperature. Moreover, the process of the present invention reduces the corrosion in polymerization apparatuses due to the removal of water and acetic acid.

EXAMPLES

The melt flow rate MFR was determined according to DIN EN ISO 1133:2005, condition D at a temperature of 190° C. under a load of 2.16 kg.

The vinyl acetate content of the copolymers was determined according to ASTM: D5594-98 (reapproved 2004), "Standard Test Method for Determination of the Vinyl Acetate Content of Ethylene-Vinyl Acetate (EVA) Copolymers by Fourier Transform Infrared Spectroscopy (FT-IR)"

Example 1

A high-pressure copolymerization of ethylene and vinyl acetate was carried out in a high-pressure tubular reactor of the design shown in FIG. 2 with four initiator injection points having in total a length of 1700 m and a diameter of 62 mm. Propene was used as molecular weight regulator in a range of 0.5 to 2 kg per ton of produced ethylene-vinyl acetate copolymer.

The propene was added to the fresh ethylene stream entering the primary compressor (1). The fresh vinyl acetate was metered to the process after the primary compressor (1) at the suction side of the first stage of the high-pressure compressor (3). The polymerization initiators were metered to the tubular reactor, using isododecane as additional solvent. The initiators used were tert-butyl peroxy-3,5,5-trimethylhexanoate, tert-butyl peroxypivalate and di(2-ethylhexyl) peroxydicarbonate. The temperature was measured at certain intervals along the reactor and the maximum temperatures of the reaction mixture in the reaction zones following the initiator injection points were adjusted to the desired levels by regulating the amount of added initiators.

The copolymerization was carried out at a reactor inlet pressure of 270 MPa. The ethylene throughput of high-pressure compressor (3) was 78.7 t/h. The vinyl acetate throughput of high-pressure compressor (3) was 17.3 t/h.

The condensed liquids obtained in separators (25), (26) and (27) of the three stages of booster compressor (21), which contained mainly vinyl acetate, were sent to a distillation unit with two distillation columns (33) and (36) and a water removal unit (39) before being recycled to the polymerization.

An ethylene-vinyl acetate copolymer with a MFR at a temperature of 190° C. under a load of 2.16 kg of 2.6 g/10 min and a vinyl acetate content of 18 wt.-% was prepared. It was possible to produce the copolymer with an hourly production rate of 24.4 t/h when polymerizing with maximum polymerization temperatures in the range of from 240 to 250° C.

Comparative Example A

Example 1 was repeated, however utilizing a set-up as shown in FIG. 1. That means, the condensed liquids obtained in separators (25), (26) and (27), which contained mainly vinyl acetate, were returned to the polymerization without any further purification.

An ethylene-vinyl acetate copolymer with a MFR at a temperature of 190° C. under a load of 2.16 kg of 2.7 g/10 min and a vinyl acetate content of 18 wt.-% was prepared. However, in order to meet the specified MFR range of 2.3 to 2.9 g/10 min and not to result in too high MFR values, it was necessary to limit the initiator feed to an amount that only maximum polymerization temperatures in the range of from 235 to 245° C. could be obtained. Accordingly, only an hourly production rate of 22.1 t/h could be achieved.

Example 2

A high-pressure copolymerization of ethylene and vinyl acetate was carried out as in Example 1. However, the ethylene throughput of high-pressure compressor (3) was 86.4 t/h and the vinyl acetate throughput of high-pressure compressor (3) was 9.6 t/h.

An ethylene-vinyl acetate copolymer with a MFR at a temperature of 190° C. under a load of 2.16 kg of 4.0 g/10 min and a vinyl acetate content of 10 wt.-% was prepared. It was possible to produce the copolymer with an hourly production rate of 27.3 t/h when polymerizing with maximum polymerization temperatures in the range of from 255 to 265° C.

Comparative Example B

Example 2 was repeated, however utilizing a set-up as shown in FIG. 1, that means returning the condensed liquids obtained in separators (25), (26) and (27) to the polymerization without any further purification.

An ethylene-vinyl acetate copolymer with a MFR at a temperature of 190° C. under a load of 2.16 kg of 4.1 g/10 min and a vinyl acetate content of 10 wt.-% was prepared. However, in order to meet the specified MFR range of 3.6 to 4.4 g/10 min and not to result in too high MFR values, it was necessary to limit the initiator feed to an amount that only maximum polymerization temperatures in the range of from 245 to 255° C. could be obtained. Accordingly, only an hourly production rate of 24.5 t/h could be achieved.

What is claimed is:

1. A process for copolymerizing ethylene and esters of vinyl alcohol in the presence of free-radical polymerization initiators at pressures from 160-350 MPa and temperatures from 130-290° C. in a continuously operated polymerization apparatus comprising a polymerization reactor, one or more compressors and a molecular weight regulator, which compress a monomer mixture comprising a proportion of comonomer or comonomers of 3-50% by weight fed to the polymerization reactor to the polymerization pressure, wherein the monomer mixture is compressed by at least two sequentially operated compressors in which the compressed gas mixture is cooled after each compression stage and the fraction of the monomer mixture, which is liquid after this cooling, is separated off and returned to the polymerization apparatus in liquid form, and wherein at least a part of the liquid fractions obtained after compressing the monomer mixture in the respective compression stage to a pressure of 0.2-10 MPa is purified such that the purified liquid fraction(s) comprise at least 99.5 wt% esters of vinyl alcohol before being returned to the polymerization process.

2. The process for copolymerizing ethylene and esters of vinyl alcohol according to claim 1, wherein the purification of the separated liquid fractions comprises a distillation step.

3. The process for copolymerizing ethylene and esters of vinyl alcohol according to claim 2, wherein the distillation step comprises a two-step distillation.

4. The process for copolymerizing ethylene and esters of vinyl alcohol according to claim 1, wherein the purification of the separated liquid fractions comprises a step of water removal by means of a molecular sieve.

5. The process for copolymerizing ethylene and esters of vinyl alcohol according to claim 1, wherein the content of esters of vinyl alcohol in the purified liquid fractions is more than 99.5% of weight.

6. The process for copolymerizing ethylene and esters of vinyl alcohol according to claim 1, wherein the water content of the purified liquid fractions is less than 30 ppm.

7. The process for copolymerizing ethylene and esters of vinyl alcohol according to claim 1, wherein the ester of vinyl alcohol is vinyl acetate.

8. The process for copolymerizing ethylene and esters of vinyl alcohol according to claim 7, wherein the obtained ethylene-vinyl acetate copolymer has a vinyl acetate content of from 10 to 40% by weight.

9. The process for copolymerizing ethylene and esters of vinyl alcohol according to claim 1, wherein the polymerization reactor is a tubular reactor or an autoclave reactor.

10. The process for copolymerizing ethylene and esters of vinyl alcohol according to claim 1, wherein the purified liquid fraction(s) comprise less than 30 ppm of water.

* * * * *

UNITED STATES PATENT AND TRADEMARK OFFICE
CERTIFICATE OF CORRECTION

| | | |
|---|---|---|
| PATENT NO. | : 10,005,862 B2 | Page 1 of 1 |
| APPLICATION NO. | : 14/654252 | |
| DATED | : June 26, 2018 | |
| INVENTOR(S) | : Finette et al. | |

It is certified that error appears in the above-identified patent and that said Letters Patent is hereby corrected as shown below:

In the Specification

In Column 2, Line 10, delete "appropriated" and insert -- appropriate --
In Column 3, Line 56, delete "comonomer" and insert -- comonomers --
In Column 4, Line 23, delete "di(2-ethyl hexyl)" and insert -- di(2-ethylhexyl) --
In Column 4, Line 67, delete "peroxy-2-ethyl hexanoate." and insert -- peroxy-2-ethylhexanoate. --

Signed and Sealed this
First Day of February, 2022

Drew Hirshfeld
*Performing the Functions and Duties of the*
*Under Secretary of Commerce for Intellectual Property and*
*Director of the United States Patent and Trademark Office*